United States Patent Office 3,133,088
Patented May 12, 1964

---

3,133,088
TETRAHYDROPYRANYL ISOCYANATES
Heinz F. Reinhardt, Claymont, Del., assignor to E. I. du Pont de Nemours and Company, Wilmington, Del., a corporation of Delaware
No Drawing. Filed Jan. 10, 1962, Ser. No. 165,301
12 Claims. (Cl. 260—345.8)

This invention relates to a new class of non-aromatic difunctional isocyanate bearing tetrahydropyran-2-yl compounds. It particularly relates to a class of non-aromatic diisocyanate compounds having improved color and lower volatility. It further relates to difunctional compounds bearing both isocyanate radicals and alkenylene or vinyl groups capable of undergoing vinyl polymerization. The compounds of this invention comprise two general categories:

$$A-B \text{ and } A-\overset{O}{\underset{\|}{C}}-R-\overset{O}{\underset{\|}{C}}-A$$

wherein:

A is the monovalent (6-isocyanatotetrahydropyran-2-yl)-methoxy group having the structural formula

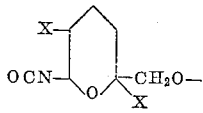

B is a monovalent radical of the class of $C_3$ to $C_5$ alkenoyl, $C_2$ to $C_{12}$ α,β-alkenyl and 6-isocyanatotetrahydropyran-2-yl carbonyl radicals;
R is a divalent hydrocarbon radical of the class of $C_1$ to $C_8$ alkylene, arylene and alkenylene radicals;
X is hydrogen or methyl.

This invention further relates to a process for making the above new class of compounds.

In the increasingly complex and demanding field of urethane polymers, an ever-increasing store of isocyanate-bearing polyfunctional compounds is needed to create polymers having highly specific processing and end use characteristics. For example, broader ranges of milleability, toughness and resiliency are needed than are obtainable with the aromatic types. Particularly desirable are isocyanate compounds which in polymers avoid the discoloration characteristic of the aromatic types and at the same time avoid the high volatility and low activity that makes the aliphatic types difficult and hazardous to use. Such isocyanates are desirable for modifying both the polymer backbone as well as side chains and terminating groups.

Isocyanate compounds having other functional groups, such as polymerizable vinyl groups, are particularly valuable as a means for creating polyurethanes which can be handled and cured under conditions not compatible with those required for conventional urethanes. In a similar manner such multifunctional or hybrid monomers can be used to introduce the high reactivity of isocyanate groups into vinyl type polymers. Vinyl polymers so modified can be processed and cured in a manner entirely different from that of conventional vinyl polymers. For example, diamino compounds can be used for curing. The presence of such isocyanate groups in addition can provide vinyl polymers with a degree of adhesion to hydrophilic and other surfaces not otherwise obtainable.

It is therefore the object of this invention to provide a new class of difunctional non-aromatic isocyanate compounds useful in making urethane polymers. It is another object to provide such compounds having mixed functionality as a means for introducing vinyl groups into urethane polymers. It is a further object to provide these compounds as a means of introducing isocyanate radicals into vinyl type polymers.

The above objects are met by the compounds of this invention as hereinbefore defined and as described in the following examples.

A general method for preparation of these compounds involves the addition of isocyanic acid to 3,4-dihydropyran derivatives under anhydrous conditions, the isocyanic acid adding across the Δ5 double bond to form 6-isocyanatotetrahydropyran derivatives.

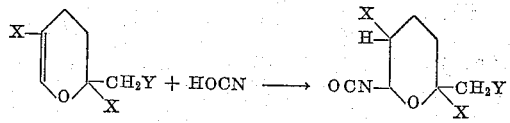

where

X is hydrogen or methyl
and
Y is a monovalent organic radical.

The parent compounds, the 3,4-dihydropyran derivatives are of a variety of types and are prepared by several different methods. Primarily, the dimers of acrolein or methacrolein on reduction lead to the appropriate 3,4-dihydropyran-2-methanol or 2,5-dimethyl-3,4-dihydropyran-2-methanol. These methanols then can be readily esterified with any of a large variety of acids and in particular those that bear unsaturated groups or are polybasic. Thus esters of these hydroxyl compounds as acrylic, methacrylic, ethacrylic, chloracrylic, cyanacrylic, crotonic and tiglic acids or of succinic, itaconic, adipic, sorbic, suberic, sebacic, phthalic, isophthalic, terephthalic, trimessic, pyromellitic, tricarballylic, maleic, and fumaric can be prepared by conventional methods. Esters with 3,4-dihydropyran-2-carboxylic acid can also be used and are derived by the well known disproportionation of the analogous dimer, i.e., a 2-formyl-3,4-dihydropyran. The residues of the above polybasic acids after removal of the carboxyl-OH are in effect the groups —R— shown in the formulas designated for the compounds of this invention.

Alternatively, unsaturated ethers of these methanols can be prepared (for example, by a method disclosed in U.S. 2,514,168, issued to Smith et al., July 14, 1950, including 3,4-dihydropyran-2-yl methyl vinyl ether and the corresponding allyl, butenyl, hexenyl, octenyl, decenyl, dodecenyl and similar ethers.

These esters and ethers can then be converted to the respective mono and poly isocyanates by addition of isocyanic acid. Thus, the tris-(3,4-dihydropyran-2-yl)methyl ester of tricarballylic acid can react to yield a mono, a di or tri isocyanate. Ethers having the alkenyl unsaturation α to the ether oxygen form predominantly a diisocyanate under these conditions, but those in which the unsaturation is at some distance from the ether oxygen form predominantly a mono isocyanate, i.e., the addition is primarily to the dihydropyranyl ring (6-isocyanatotetrahydropyran-2-yl)methyl alkenyl ether.

The following examples illustrate this invention.

EXAMPLE I

Step 1

In a stirred vessel equipped with heater, thermometer, inert gas inlet and condenser are placed:

| | Parts |
|---|---|
| 3,4-dihydropyran-2-methanol | 456 |
| Methyl methacrylate | 936 |
| Hydroquinone | 2.5 |
| Sodium methoxide | 2.5 |

The vessel is purged with nitrogen and the mixture heated and refluxed so that the column temperature is about 90°

C. An additional 7.5 parts of sodium methoxide is added in small portions over a period of 8 hours. After 10 hours, excess methyl methacrylate is stripped off and the product 3,4-dihydropyran-2-yl methyl methacrylate is distilled at 54°–57° C. at 0.15 mm. Hg pressure.

*Step 2*

In a vessel similar to that above are placed 45.5 parts of the above product and 0.1 part of p-toluene sulfonic acid. To this is added slowly 17.5 parts of isocyanic acid in 39.5 parts of benzene while the contents of the flask are cooled to about 29° C. After three hours' stirring at room temperature, the contents are stripped of excess benzene and acid at reduced pressure and then filtered. A clear colorless liquid results. Infrared spectral analysis shows the presence of OCN— and ester and methylene groups. The product is identified as (6-isocyanatotetrahydropyran-2-yl) methyl methacrylate.

EXAMPLE II

In a manner corresponding to the above, the (6-isocyanatotetrahydropyran-2-yl) methyl acrylate is prepared by substituting an equimolar amount of methyl acrylate for the methyl methacrylate in Step 1 of Example I. An analogous ester is obtained using (2,5-dimethyl-3,4-dihydropyran-2-yl) methyl acrylate.

EXAMPLE III

Using 228 parts of 3,4-dihydropyran-2-methanol and 344 parts of diethyl fumarate in the process of Step 1 of Example I, and using the then resulting [dihydropyran-2-yl-methyl] fumarate on an equimolar basis in Step 2 to replace the methyl methacrylate, a bis-[(6-isocyanatotetrahydropyran-2-yl) methyl] fumarate results.

The corresponding maleate, adipate, phthalate and itaconate esters are prepared by using equimolar portions respectively of diethyl maleate, diethyl phthalate, diethyl itaconate or diethyl adipate in place of diethyl fumarate of Example III.

EXAMPLE IV

In the equipment of Example I are placed 224 parts of (3,4-dihydropyran-2-yl) methyl (3,4-dihydropyran-2-yl) carboxylate and 1.0 part of p-toluene sulfonic acid. To this are added slowly with cooling at 30° C. about 140 parts of isocyanic acid dissolved in 320 parts of benzene. After stirring and reacting for about 3 hours at room temperature, the excess benzene and isocyanic acid is stripped off at reduced pressure and the liquid product filtered to remove solid impurities. The corresponding diisocyanate of the starting material results: (6-isocyanatotetrahydropyran-2-yl) methyl (6-isocyanatotetrahydropyran-2-yl) carboxylate.

EXAMPLE V

Using equipment similar to that of Example I, 140 parts of (3,4-dihydropyran-2-yl) methyl vinyl ether and 0.4 part of p-toluene sulfonic acid are placed in the vessel. While stirring, 140 parts of isocyanic acid dissolved in 320 parts of dry benzene are added slowly and the temperature of the reaction mixture maintained below about 30° C. After a period of about 4 hours at this temperature, the excess materials are stripped off at reduced pressure and the residual distilled under reduced pressure to yield the diisocyanate product 2-(6-isocyanatotetrahydropyran-2-yl-methoxy) ethyl isocyanate.

The diisocyanates of this invention can be used alone or with other diisocyanates, especially aromatic diisocyanates, to react with diamines, diols and amine or hydroxy-terminated polyesters, polyamides and polyethers to form polyurethanes. Any of many well recognized processes can be used, including solution polymerization in inert solvents as well as bulk polymerization in heavy duty mixers or on rubber milling equipment. Toughness or hardness of such polymers can be varied depending on the size of the diisocyanate. Thus, those from Examples IV or V will produce harder polymers than will those from Example III, such as the adipate or sebacate diesters. Vinyl groupings can be introduced into such polymers via termination with the acrylic or methacrylic type isocyanates or along the chain via, for example, the itaconate diesters of (6-isocyanatotetrahydropyran-2-yl) methanol. Cross-linking the latter with peroxides, free radical sources, even sulfur compounds, can subsequently be used to improve ploymer properties.

In contrast, vinyl polymers can be prepared under anhydrous, active-hydrogen free conditions, having active isocyanate groups along or terminating the chain. Thus, methyl acrylate, butyl methacrylate and similar esters can be copolymerized, for example, with the isocyanate products of Examples I and II to yield polymers that can be solution-cast and later crosslinked by exposure to moisture, diamines, etc. Similarly, the alkenyl ethers of isocyanatotetrahydropyran can be copolymerized with other vinyl monomers inert to isocyanates, e.g., acrylates, alkenes, vinyl acetate, vinyl ethers, etc., using free radical sources under anhydrous conditions, e.g., peroxides, azo-bis-isobutyronitrile, etc.

I claim:
1. A composition of matter selected from the class consisting of compounds having the following structural formula:

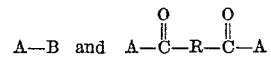

wherein:
A is a nonvalent organic radical having the formula

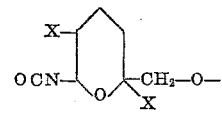

in which X is selected from the class consisting of hydrogen and methyl;
B is a monovalent radical selected from the class consisting of $C_2$ to $C_{12}$ alkenyl, $C_3$ to $C_5$ alkenoyl radicals and (6-isocyanatotetrahydropyran-2-yl)carbonyl;
R is a divalent hydrocarbon radical selected from the class consisting of $C_1$ to $C_8$ alkylene, arylene and alkenylene radicals.
2. (6-isocyanatotetrahydropyran-2-yl)methyl acrylate.
3. (6 - isocyanatotetrahydropyran - 2-yl)methyl methacrylate.
4. Bis[(6-isocyanatotetrahydropyran - 2 - yl)methyl] maleate.
5. Bis[(6 - isocyanatotetrahydropyran - 2-yl)methyl] itaconate.
6. Bis[(6 - isocyanatotetrahydropyran - 2-yl)methyl] fumarate.
7. Bis[(6 - isocyanatotetrahydropyran - 2-yl)methyl] phthalate.
8. Bis[(6 - isocyanatotetrahydropyran - 2-yl)methyl] adipate.
9. (6 - isocyanatotetrahydropyran - 2-yl)methyl (6-isocyanatotetrahydropyran-2-yl)carboxylate.
10. 2 - (6 - isocyanatotetrahydropyran-2-yl-methoxy) ethyl isocyanate.
11. The A—B composition of claim 1 in which X is hydrogen.
12. The

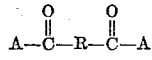

composition of claim 1 in which X is hydrogen.

References Cited in the file of this patent
UNITED STATES PATENTS
3,022,256    Barnes et al. _____ Feb. 20, 1962